Figure 1:
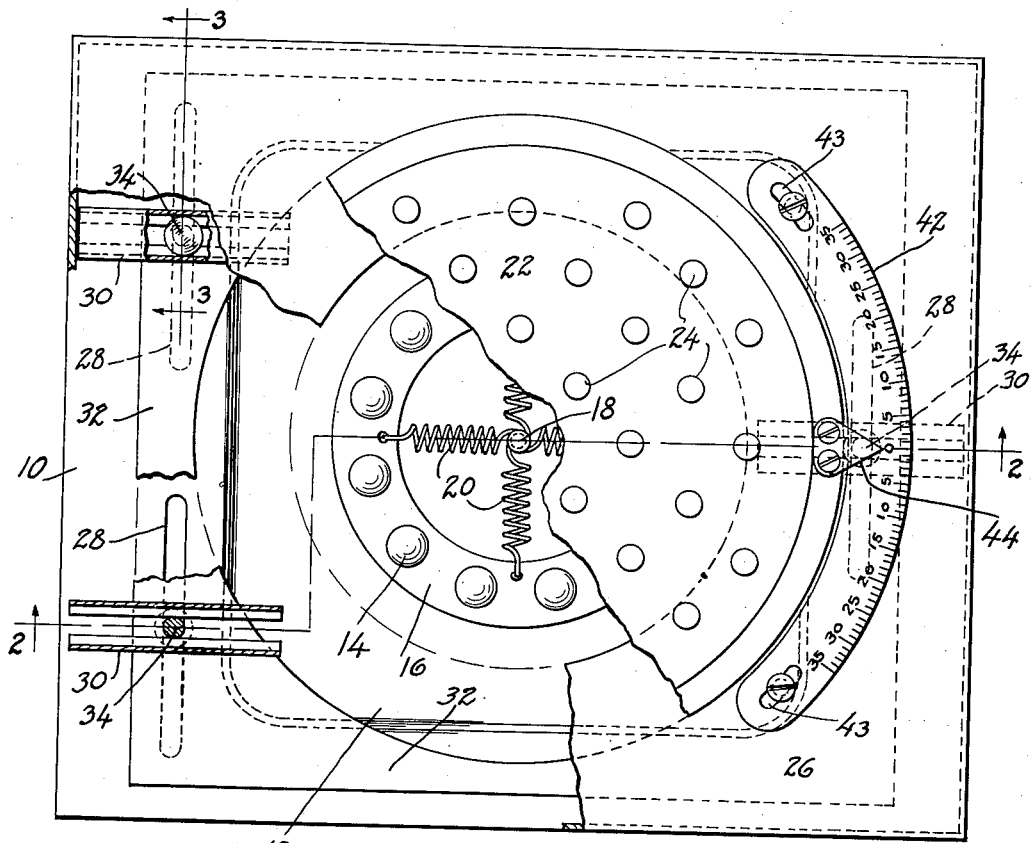

April 25, 1939.   G. M. GRAHAM ET AL   2,155,541
RADIUS TURNING GAUGE
Filed April 22, 1935

INVENTORS.
George M. Graham and Arthur E. Price
BY
Parker & Burton
ATTORNEYS.

Patented Apr. 25, 1939

2,155,541

UNITED STATES PATENT OFFICE 2,155,541

RADIUS TURNING GAUGE

George M. Graham, Detroit, and Arthur E. Price, Jackson, Mich., assignors to Hinckley-Myers Company, Jackson, Mich., a corporation of Michigan Application April 22, 1935, Serial No. 17,652

6 Claims. (Cl. 33—203)

This invention relates to a radius turning gauge for assisting in the alignment of vehicle wheels, and particularly to such a device having an improved manner of compensating for the lateral shifting or displacement of the wheels when the same are swung through their turning radius.

In determining the alignment of the front steering wheels of vehicles, it is necessary to turn the wheel from side to side through prescribed angles. Due to the geometric relations of these wheels to their supports on the vehicle, the contact point of the wheel with the ground shifts laterally as the wheel is turned from side to side. This lateral motion is best described as planetary in character and follows as a result of the failure of the castor, camber and king pin inclinations to coincide at the point of contact of the wheel on the ground.

An important object of this invention is to provide an improved device for measuring the exact angles through which the wheel is turned from side to side and which is at the same time capable of compensating for the planetary displacement of the wheel during its turning movements.

A further object of this invention is to provide such a device which contains few parts, is simple and inexpensive to manufacture, and is rugged in construction.

This improved construction embodies a base and a wheel carrying disc supported for rotatable and slidable movement with respect to the base through the employment of a pair of superimposed slidable plates wherein the upper plate carries the disc and the lower plate is disposed intermediate the upper plate and the base. An important feature of the construction is that the lower or intermediate plate is provided with studs projecting downwardly into the guideways of the base and upwardly into guideways in the upper plate through which interconnection angular slidable movement of the two plates is permitted while the connection between the two plates and the base is such that the device forms a unitary structural assembly.

Various other objects and meritorious features of the invention reside in the simplicity of arrangement and of the parts utilized whereby the expense of manufacture and assembly is substantially reduced while at the same time providing a compact integral unit.

Figure 2:
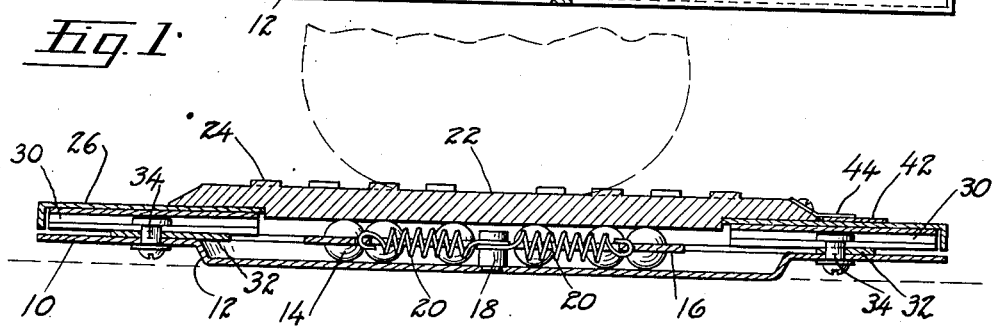
Figure 3:
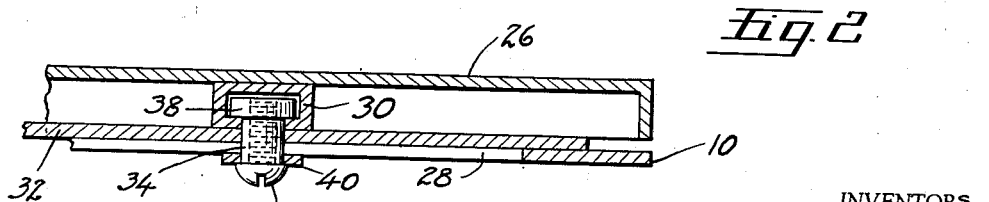

Reference is now made to the drawing wherein:

Figure 1 is a plan view, with parts broken away, of the radius turning gauge showing the manner of assembly, Figure 2 is a sectional view on line 2—2 of Figure 1, and Figure 3 is an enlarged sectional view on line 3—3 of Figure 1.

The base plate 10 has a circular dished or depressed portion 12 which forms a recess for retaining the thrust ball bearing 14 caged within an annular plate 16. A pin 18 extends upwardly centrally in the depression 12 and diametrically opposite springs 20 yieldingly center the ball cage 16 about the pin as shown in Figure 1.

A wheel supporting disc 22 is supported on the bearings for rotatable and lateral movement with respect to the base plate. Small protrusions 24 formed in the surface of the disc assist in preventing relative movement of the disc with respect to the wheel which the latter is supported thereon for wheel alignment tests.

Between the disc 22 and the base plate 10 and around the rim of the latter are a pair of superposed members or plates which are so slidably mounted with respect to one another and the base plate as to provide the disc with a planetary or lateral shifting movement in any direction. The upper of these two plates is indicated at 26 and is provided with a central hole of less diameter than the disc 22 in order that the disc may overlap the same as shown in Figure 2. The disc 22 is provided with a circular depending portion protruding through the hole in the upper plate and snugly interfitting with the same so that both the disc and the upper plate are laterally shiftable together as a unit. The disc, however, is free to rotate with respect to the upper plate 26 irrespective of any lateral displacement that may occur.

The base plate 10 is provided with guideways or slots 28 extending along two opposed edges. The plate 26 is provided on its underside with guideways or channeled elements 30 extending at 90° to and directly crossing the guideways in the base. In this instance, three of such guideways are shown in the base 10 and three of such channeled elements in the upper plate 26. These channeled elements 30 consist as shown in Figure 3 of a metal piece having turned over edges forming a slot of less width than the enclosed space in which the head of a stud is adapted to slide.

Between the base plate and the upper plate 26 is a third member or intermediate plate 32 carrying studs 34 interfitting with the slots 28 in the base 10 and with the channeled elements 30 in the upper plate 26. One such stud is provided for each pair of superposed guideways. As shown in Figure 3 these studs may comprise a screw 36 threaded into a shouldered cylinder 38 which slidably fits within the channel formed by the element 30. A washer 40 which overlaps the slot in the base plate may be provided adjacent the head of the screw. The intermediate plate 32 is likewise provided with a central hole which corresponds generally with the dished portion of the base plate. Each stud is capable of slidable movement in either of the guideways thus enabling the upper plate and likewise the disc to shift longitudinally and laterally, or a combination of either of these movements. The resulting effect is characterized as a planetary movement.

A protractor dial 42 is mounted in a convenient position, concentric to the center of the disc, on the upper plate 26. This dial may be slotted as indicated at 42 for circumferential adjustment if desired. The dial is marked to read in degrees the angles through which the disc rotates. A pointer 44 on the disc sweeps over the dial and indicates the angle through which the disc rotates.

The operation of this device is readily understood. Thus, if a pair of these devices are placed under the front wheels of an automobile and by means of brakes or other clamps the wheels are restrained from rotation around the wheel spindle, it will be possible to measure the angle through which the wheels are swung around their turning axes irrespective of the lateral displacement of the point of contact of the wheel under its support.

The slidable relationship of the plates compensates for this lateral displacement without producing any effect upon the measurement of the exact radial movement of the disc as it is rotated by the wheel. The intermediate member 32 is capable of sliding movement in the direction of the slots in the base member, and the upper plate 26 is capable of slidable movement at right angles thereto by means of the channeled pieces secured to its underside. These two movements together have the ability of producing a lateral or planetary displacement of the disc in any direction.

We claim:

1. A radius turning gauge comprising, in combination, a base having guideways extending in one direction, a plate superposing said base and provided with guideways extending angularly with respect to those in the base and adapted to superpose the same, an element between said base and said plate provided with studs fixed therein and extending into the guideways of the base and the guideways of the plate for sliding movement therein, said plate having a circular aperture, and a wheel supporting disc rotatably carried in said aperture.

2. A radius turning gauge for vehicle wheels comprising, in combination, a base provided with a dished out central section and a surrounding raised rim, a pair of members supported upon said rim in superposed relationship and each provided with an aperture above said dished portion, said lower member slidably connected with the base through guideways provided in the base and studs provided in the lower member, said upper member slidably connected with the lower member through guideways provided in the upper member and studs provided in the lower member, bearings in said dished section of the base, a disc rotatably and slidably supported on said bearings and overlapping the upper of said pair of slidable members and rotatable within the aperture of said member, and means associated with said disc and said upper member for measuring the angles subtended by the rotation of the disc with respect to the upper member.

3. A radius turning gauge of the character described comprising, in combination, a base having a dished central portion and an elevated rim portion and provided with a plurality of parallel guideways in the rim portion, a member superposing said base having a central aperture superposing the dished portion of the base and provided with a plurality of guideways extending in a direction perpendicular to those in the base, an element disposed between said base and said member having a plurality of studs extending from opposite sides and interfitted in the guideways in the base and the member for slidable movement therein, thrust bearings in the dished portion of said base, and a wheel supporting disc rotatably disposed within the aperture of said member supported upon the bearings to carry the loads imposed thereon.

4. An article of the class described comprising, in combination, a base provided with guideways, a plate superimposing the base provided with downward extensions disposed in said guideways to permit slidable movement of the plate with respect to the base, a second plate superimposing the first plate and provided on its underside with channel guide elements extending at right angles to the guideways in the base, upward extensions provided on said first plate disposed in said channel guide elements to permit slidable movement of the upper plate with respect to the lower plate, said extensions provided with means securing the upper plate to the base through the lower plate, and a disc rotatably carried by the upper plate.

5. An article of the class described comprising, in combination, a base provided with a central disposed area and an elevated margin surrounding said area, said margin provided with guideways, a plate superimposing the base provided with studs extending into said guideways to permit slidable movement of the plate with respect to the base, said studs connected with the base to secure the plate thereto, a second plate superimposing the first plate and provided on its one side with guideways, said studs on the first plate projecting above the plate into the guideways of the upper plate to permit slidable movement of the upper plate with respect to the lower plate and connected with the upper plate to secure it to the lower plate, a disc supported within the upper plate, bearings arranged within the depressed area of the base underneath said disc to take the weight of the disc.

6. The invention as defined in claim 5 characterized in that spring means is provided adapted to yieldingly maintain the bearings supported centered within the depressed area of the base.

ARTHUR E. PRICE.
GEORGE M. GRAHAM.